Jan. 7, 1936. P. ALIANO 2,027,141
AUTOMOBILE BODY
Filed June 27, 1934 2 Sheets-Sheet 1
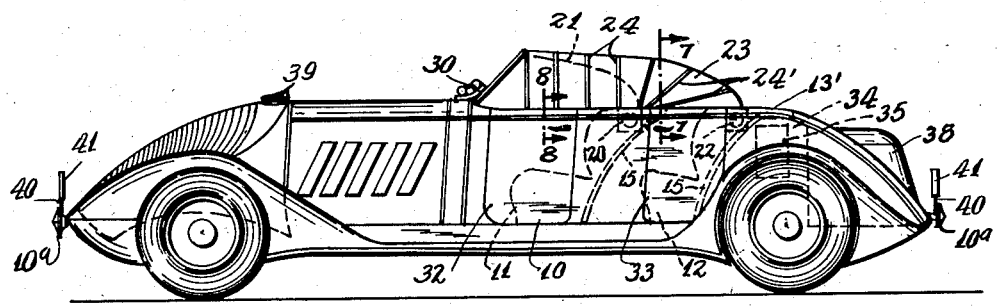
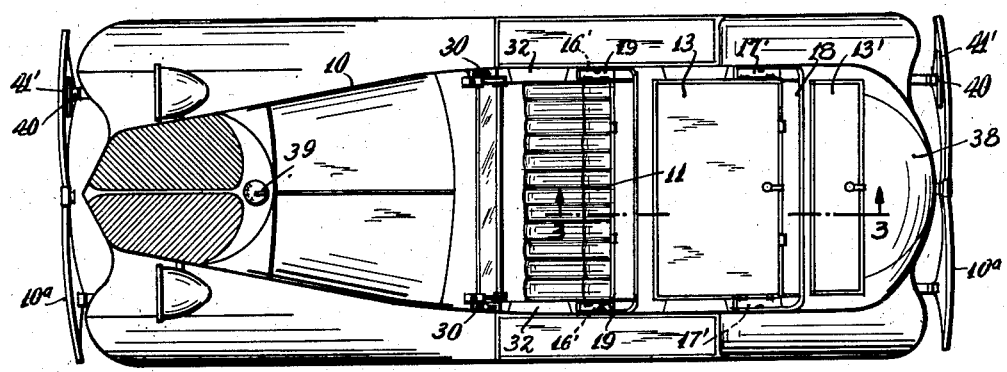
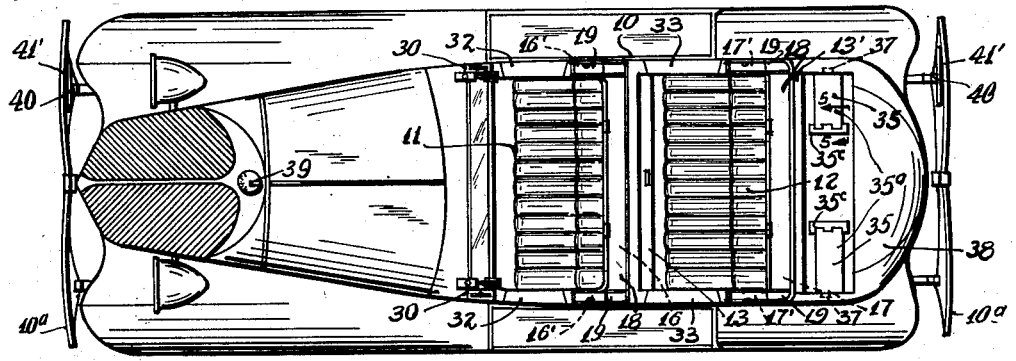
INVENTOR
PETER ALIANO
BY
ATTORNEY Jan. 7, 1936.  P. ALIANO  2,027,141

AUTOMOBILE BODY

Filed June 27, 1934  2 Sheets-Sheet 2

INVENTOR
PETER ALIANO
BY
ATTORNEY

Patented Jan. 7, 1936

2,027,141

UNITED STATES PATENT OFFICE 2,027,141

AUTOMOBILE BODY

Peter Aliano, Brooklyn, N. Y., assignor of forty per cent to Jennie Milea, Brooklyn, N. Y.

Application June 27, 1934, Serial No. 732,602

1 Claim. (Cl. 296—98)

This invention relates to new and useful improvements in an automobile body and is characterized by a body adapted to be converted from a roadster into a touring car and back again into a roadster.

The invention has for an object the construction of a device as mentioned which is characterized by the provision of rumble seat covers for covering rumble seats of the body and arranged in a manner so that the seat covers may assume open positions or extended downwards into the body of the car to expose the rumble seats.

Still further the invention also proposes an arrangement wherein tent portions for the body are normally engaged in compartments extending around the seats in the body in a manner so that they may be collapsed and hidden from view or may be extended when desired.

Still further the invention contemplates an arrangement wherein guides are provided along the sides of the body and are associated with the rumble seat covers in such a manner as to guide the opening and closing of these parts.

Still further the invention also contemplates an arrangement wherein the tents previously mentioned are arranged around the front seats of the body and the rumble seats of the body in such a manner that either of the tents may be used in their open positions.

Still further the invention contemplates a construction of tent for a device as mentioned which is characterized by a central area constituting the top thereof adapted to be rolled upon a roller in a compartment in said body and adapted to be connected with and associated with side portions to conclude the formation of the tent.

Still further the invention contemplates a construction whereby the edges of the materials forming the tent may be connected with each other and the tent suitably connected upon the said body.

Still further the invention also contemplates a novel arrangement for a license plate holder for a motor vehicle.

Another one of the objects of this invention is the construction of a convertible body as mentioned which is simple and durable and which may be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:—

Fig. 1 is a side elevational view of an automobile body constructed according to this invention.

Fig. 2 is a plan view of Fig. 1 illustrated with the body in the form of a roadster.

Fig. 3 is a fragmentary sectional view taken on the line 3—3 of Fig. 2.

Fig. 4 is a plan view of the body when converted into the form of a touring car.

Fig. 8 is a fragmentary sectional view taken on the line 8—8 of Fig. 1.

Figure 10:
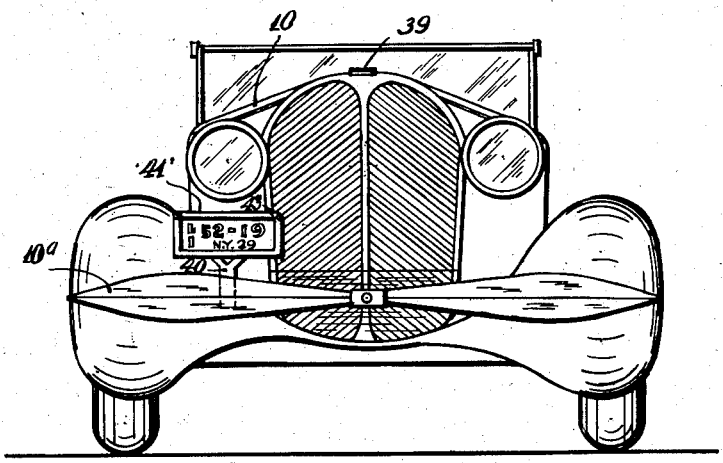
Fig. 10 is a front view of a vehicle constructed with a license plate holder according to another embodiment of this invention.

The invention is associated with a car body 10 with front and rear bumpers 10$^a$ having front seats 11 and rear seats 12. The purpose of the invention is to convert the body 10 from a roadster into a touring car and vice versa. The body is provided with a rumble seat cover 13 for covering the rear seats 12. This rumble seat cover is provided with followers 14 engaging in grooves 15 on the inner sides of the body 10 in such a manner that the cover may be moved from a closed position as shown in Fig. 3 to an open position as shown in Fig. 4. The front edge 13$^a$ of the cover 13 is formed with a flange adapted to coact with a complementary flange 10$^b$ upon the body.

Figure 7:
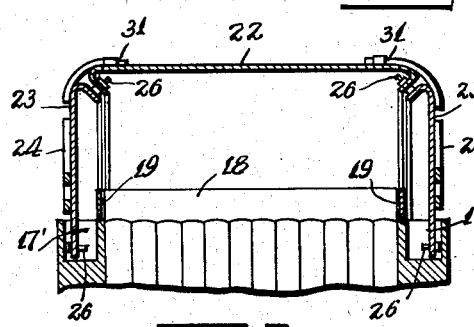
Fig. 7 is a transverse sectional view as though taken on the line 7—7 of Fig. 1.
Figure 6:
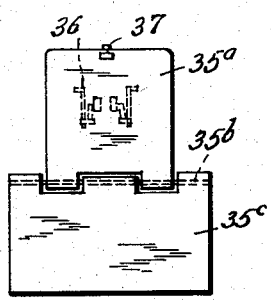
Fig. 6 is an elevational view of Fig. 5.
Figure 5:
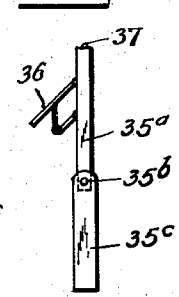
Fig. 5 is a fragmentary elevational view of one of the rumble seats shown in a raised position.
Figure 9:
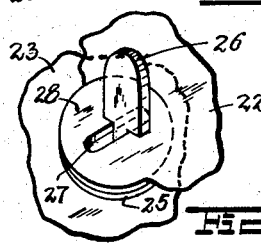

The body 10 is built with transverse compartments 16 and 17 respectively across the backs of the front seats 11 and the rear seats 12. Associated with these transverse compartments 16 and 17 there are end compartments 16' and 17'. The transverse compartments are equipped with covers 18 with which they may be closed. Similarly the end compartments are equipped with covers 19 with which they may be closed. These covers are hingedly mounted upon the body and adapted to be moved from closed positions as illustrated for example in Fig. 3 to open positions as illustrated for example in Fig. 7.

A roadster tent is used in the transverse compartment 16 and the end compartment 16', while a touring tent is used in the transverse compartment 17 and the end compartment 17'.

The roadster tent comprises a central tent portion 20 which is wound upon a roller within the transverse compartment 16. This central portion is adapted to coact with end portions 21 normally housed within the end compartments 16'. The arrangement is such that the end compartments of the tent may be extended and then the central portion of the tent extended and these parts connected together along their edges as hereinafter further described in greater detail with respect to the touring car tent. The touring car tent comprises a central portion 22 which is wound upon a roller in the transverse compartment 17 and this central portion is adapted to coact with end tent portions 23 which are normally housed within the end compartments 17'. These end tent portions 23 are formed with vertical ribs 24 along their lengths and with inclined ribs 24' at the rear portions thereof. The purpose of these ribs is to stiffen the sides so that they maintain their shapes. The side portions of the tent are adapted to be selectively collapsed for engagement within the compartments 17'. It should be noticed that the ribs 24 are not connected with each other so that the material of the tent portion between these ribs may be folded portion upon portion with the collapsing of the sides into the compartments. The inclined ribs 24' allow the curved portion at the rear ends of the sides of the tent to be collapsed within the end compartments 17'.

Figure 9:
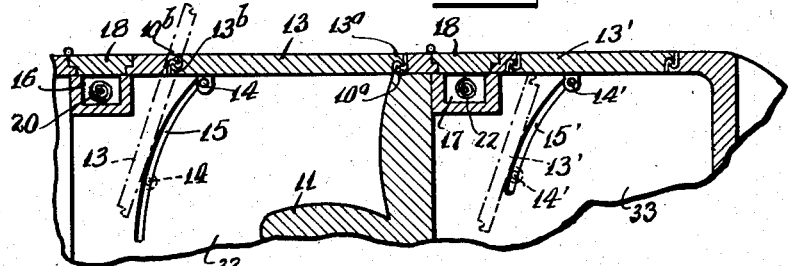
Fig. 9 is a perspective view showing in detail one of the connections for connecting the various parts of the tents with each other and with the body of the vehicle.

The edges of the central portions and the side portions of the tent are connectible with each other by the provision of connecting elements as illustrated in detail in Fig. 9. Each of these connecting elements comprises a base element 25 attached upon one of the parts and provided with a rotative flattened head 26 engageable through an elongated slot 27 in a complementary part 28 attached upon the other element. The arrangement is such that the flattened head 26 may be engaged through the slot 27 and then rotated through 90° to constitute the latched position of the device. This particular type of fastener is generally known at the present time in the automobile trade and is used for holding the tents on roadsters. From an inspection of Fig. 7 it should be noticed that the fastening elements are arranged upon adjacent portions of the central and side portions of the tent and in this manner are adapted to coact with each other for the proper connection of the parts. Similarly, portions of the sides of the tent are also provided with the fastening arrangement adapted to coact with the body of the vehicle as clearly illustrated in Fig. 8 so that the sides of the tent may be held down upon the body of the vehicle. A pair of clamps 30 are mounted upon the body of the vehicle at the front ends of the tents, in their extended positions, for connection with these front ends to further reinforce the holding of the tents in the extended positions. To supplement the holding action of the fasteners illustrated in Fig. 9 at various points along the central portion and sides of the tents there are strap and buckle constructions 31.

The body 10 is formed with side doors 32 and 33 arranged slightly to the front of the seats 11 and 12 respectively. These side doors are of conventional construction and for this reason further details will not be given in this specification.

The automobile body is constructed with extra passenger space 34. This extra passenger space is closed with an additional rumble seat door 13' of similar construction to cover 13. The rumble seat cover 13' is provided with side followers 14' engaging in grooves 15' formed upon the inner sides of the body. Within the space 34 there is provided a pair of collapsible seats 35. Each of these collapsible seats comprises a seating portion 35$^a$ hingedly mounted at 35$^b$ upon a support base portion 35$^c$. The hinged portion 35$^a$ is provided with a foldable foot 36 so that it may be supported in operative positions upon the floor of the body. The front edge of the hinged portion 35 is provided with a latching mechanism 37 by which it may be latched in the operative lower position by engagement with the side walls of the body. The arrangement is such that the seat may be lowered and cannot be raised unless the latch 37 is operated to release its holding condition.

The rear of the body 10 is formed with a shelf portion 38 upon which a trunk may be supported. The radiator of the motor vehicle is provided with a center dial cap 39. The vehicle body is provided with a license plate holder comprising a support bracket 40 supporting a frame structure 41 in which the license plate may be inserted. This frame structure 41 has one side 41' hingedly connected at the point 42 and held in operative position with a screw 43. The frame 41 has the sides thereof of regular frame structure, that is, channel shape so as to engage the edges of the license plate 44. The arrangement is such that the license plate may readily be removed and replaced.

While I have shown and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:—

In combination with the body of an automobile having an open top, a compartment across the rear end of said opening and compartments along opposite sides of the opening near the rear end and partially extending to the front end, and a tent in said compartments comprising a central rolled section housed in the end compartment and extendible to the front and side sections housed in said side compartments and extendible upwards and forwards to the front of said opening, and means for connecting and holding the sections of the tent, said side sections being foldable and extendible in accordion fashion.

PETER ALIANO.